(12) United States Patent
Basterash et al.

(10) Patent No.: US 11,815,277 B2
(45) Date of Patent: Nov. 14, 2023

(54) FAILURE DETECTION AND COMPENSATION IN HEATING, VENTILATION AND AIR CONDITIONING (HVAC) EQUIPMENT

(71) Applicant: Trane International Inc., Davidson, NC (US)

(72) Inventors: Thomas C. Basterash, East Bethel, MN (US); Mark E. Martin, Chisago City, MN (US); Udhaya Kumar Dayalan, Lino Lakes, MN (US)

(73) Assignee: TRANE INTERNATIONAL, INC., Davidson, NC (US)

( * ) Notice: Subject to any disclaimer, the term of this patent is extended or adjusted under 35 U.S.C. 154(b) by 77 days.

(21) Appl. No.: 17/203,058

(22) Filed: Mar. 16, 2021

(65) Prior Publication Data
US 2022/0299234 A1    Sep. 22, 2022

(51) Int. Cl.
F24F 11/74    (2018.01)
F24F 11/32    (2018.01)

(52) U.S. Cl.
CPC .............. *F24F 11/74* (2018.01); *F24F 11/32* (2018.01)

(58) Field of Classification Search
CPC .. F24F 11/30; F24F 11/64; F24F 11/46; F24F 11/38; F24F 11/32; F24F 11/65; F24F 11/54; F24F 11/80; F24F 2110/40; F24F 11/74; F24F 11/72; F24F 11/77; F24F 2110/00; F24F 2140/40; F24F 11/79; F24F 2011/0005; F24F 2221/50; F24F 3/00;
(Continued)

(56) References Cited

U.S. PATENT DOCUMENTS 5,024,265 A    6/1991    Buchholz et al.
5,545,086 A *  8/1996    Sharp .................. F24F 11/70
                                            454/238
(Continued)

FOREIGN PATENT DOCUMENTS

JP    2015169395 A    9/2015
WO   2020/018147 A1   1/2020

OTHER PUBLICATIONS

Extended Search Report dated Jul. 29, 2022, for EP Application No. 22162559.3-1016, 10 pages.

*Primary Examiner* — Darrin D Dunn
(74) *Attorney, Agent, or Firm* — WOMBLE BOND DICKINSON (US) LLP (57) ABSTRACT

A method is provided for controlling heating, ventilation and air conditioning (HVAC) equipment configured to control environmental conditions in confined areas of a facility. The method includes monitoring at least one of the HVAC equipment or the confined areas. The method includes detecting a failure of a first of the HVAC equipment to control an environmental condition in a first of the confined areas to a setpoint for the environmental condition, with the environmental condition including at least one of temperature, humidity or air quality. The method includes controlling at least one of the first or a second of the HVAC equipment to cause additional conditioned air to permeate to the first of the confined areas from an adjacent, second of the confined areas to move the environmental condition in the first of the confined areas closer to the setpoint to compensate for the failure, automatically as a direct result of detection of the failure.

20 Claims, 7 Drawing Sheets

(58) Field of Classification Search
CPC ............ G05B 15/02; G05B 2219/2614; G05B 19/042; G05B 23/0283; G05B 23/0267
See application file for complete search history.

(56) References Cited

U.S. PATENT DOCUMENTS

| | | | | |
|---|---|---|---|---|
| 7,251,953 | B2* | 8/2007 | Wetzel | F24F 1/022 |
| | | | | 454/236 |
| 7,809,472 | B1 | 10/2010 | Silva et al. | |
| 9,441,850 | B2* | 9/2016 | Sato | F24F 3/065 |
| 9,638,435 | B2 | 5/2017 | Ambriz et al. | |
| 9,851,728 | B2 | 12/2017 | Matsuoka et al. | |
| 10,274,945 | B2 | 4/2019 | Arensmeier et al. | |
| 2007/0178823 | A1* | 8/2007 | Aronstam | F24F 11/30 |
| | | | | 165/205 |
| 2008/0033674 | A1* | 2/2008 | Nikovski | F24F 11/30 |
| | | | | 702/108 |
| 2010/0106308 | A1 | 4/2010 | Filbeck et al. | |
| 2012/0158718 | A1* | 6/2012 | Transier | G06F 16/319 |
| | | | | 707/730 |
| 2015/0250076 | A1* | 9/2015 | Kondo | H05K 7/20836 |
| | | | | 361/679.48 |
| 2018/0328615 | A1* | 11/2018 | Lo | F24F 11/745 |
| 2019/0017720 | A1* | 1/2019 | Otsuki | F24F 11/65 |
| 2020/0292187 | A1* | 9/2020 | Naughton | F24F 11/0001 |
| 2020/0400328 | A1* | 12/2020 | Zhou | F24F 11/56 |
| 2021/0231332 | A1* | 7/2021 | Taniguchi | F24F 11/61 |
| 2021/0239345 | A1* | 8/2021 | Arensmeier | F24F 11/64 |
| 2022/0003447 | A1* | 1/2022 | Williams | F24F 11/46 |
| 2022/0128252 | A1* | 4/2022 | Reider | F24F 11/63 |

* cited by examiner

414 — CONTROL THE FIRST OF THE HVAC EQUIPMENT TO REDUCE AIR PRESSURE IN THE FIRST OF THE CONFINED AREAS, AND THEREBY DRAW ADDITIONAL CONDITIONED AIR TO THE FIRST OF THE CONFINED AREAS FROM THE ADJACENT, SECOND OF THE CONFINED AREAS

416 — CONTROL THE SECOND OF THE HVAC EQUIPMENT TO PRODUCE ADDITIONAL CONDITIONED AIR IN THE ADJACENT, SECOND OF THE CONFINED AREAS, THE ADDITIONAL CONDITIONED AIR CAUSED TO PERMEATE TO THE FIRST OF THE CONFINED AREAS

FIG. 4C

418 — PERFORM AN EVALUATION OF STATES OF BARRIERS THAT DIRECTLY OR INDIRECTLY ALLOW INGRESS INTO AND EGRESS FROM THE FIRST OF THE CONFINED AREAS TO DETERMINE THE SECOND OF THE HVAC EQUIPMENT

FIG. 4D

420 — MONITOR THE FIRST OF THE CONFINED AREAS AS THE AT LEAST ONE OF THE FIRST OR THE SECOND OF THE HVAC EQUIPMENT IS CONTROLLED TO COMPENSATE FOR THE FAILURE

422 — DETERMINE FAILURE OF THE ENVIRONMENTAL CONDITION IN THE FIRST OF THE CONFINED AREAS TO MOVE AT LEAST A THRESHOLD AMOUNT CLOSER TO THE SETPOINT WITHIN A SPECIFIED TIME PERIOD

424 — PERFORM A FURTHER ACTION IN RESPONSE TO THE FAILURE OF THE ENVIRONMENTAL CONDITION TO MOVE AT LEAST THE THRESHOLD AMOUNT CLOSER TO THE SETPOINT

426 — CEASE CONTROL OF THE AT LEAST ONE OF THE FIRST OR THE SECOND OF THE HVAC EQUIPMENT TO COMPENSATE FOR THE FAILURE

428 — NOTIFY A FACILITY OPERATOR OF AT LEAST ONE OF THE FAILURE OF THE FIRST OF THE HVAC EQUIPMENT, OR THE FAILURE OF THE ENVIRONMENTAL CONDITION TO MOVE AT LEAST THE THRESHOLD AMOUNT CLOSER TO THE SETPOINT

430 — CONTROL ACCESS CONTROL EQUIPENT IN THE FACILITY TO CONTROL ONE OR MORE BARRIERS THAT DIRECTLY OR INDIRECTLY ALLOW INGRESS INTO AND EGRESS FROM THE FIRST OF THE CONFINED AREAS OR THE SECOND OF THE CONFINED AREAS TO FACILITATE PERMEATION OF THE BODY OF MATTER OR RADIATION TO THE FIRST OF THE CONFINED AREAS

FAILURE DETECTION AND COMPENSATION IN HEATING, VENTILATION AND AIR CONDITIONING (HVAC) EQUIPMENT

TECHNOLOGICAL FIELD

The present disclosure relates generally to control of environmental control equipment of a facility, and in particular, failure detection and compensation in HVAC equipment of a facility.

BACKGROUND

Buildings and other facilities have complex heating, ventilation and air conditioning (HVAC) equipment systems to control environmental conditions such as temperature, humidity, air quality and the like in various confined spaces. A building may be divided up into various spaces or areas with each space being served by a respective piece of HVAC equipment. These pieces of HVAC equipment may experience some type of failure, which may be or result in a failure of the HVAC equipment to control an environmental condition to a setpoint. That is, the failure of a piece of HVAC equipment may be or cause a deviation of the temperature in a confined area from a temperature setpoint (e.g., too warm, too cold).

The failure of HVAC equipment to control an environmental condition to its setpoint may lead to uncomfortable conditions for occupants of the building or other facility. In some cases, the occupants are forced to "deal with" the existing conditions until the defective equipment is serviced. In other cases, the occupants or a facility operator take manual steps in an attempt to mitigate the situation. In particular, for example, additional equipment may be brought in to help condition the confined area.

BRIEF SUMMARY

Example implementations provide an improved apparatus and method of controlling one or more environmental control equipment such as HVAC equipment configured to control environmental conditions in confined areas of a facility. According to some example implementations, a failure of HVAC equipment to control an environmental condition in a confined area may be detected such as through various equipment diagnostics that are reported, or evaluation of deviations from various setpoints that fall outside established normal parameters. In response, the HVAC equipment experiencing the failure or another piece of HVAC equipment may be automatically instructed to compensate for the failure. This may include instructing HVAC equipment for an adjacent confined area that is physically near the confined area, such as to increase their cooling or heating capacity, airflow or the like. The HVAC equipment may then be returned to normal operation when the failure has been remediated.

Example implementations may help keep the facility as comfortable as possible for all occupants. In other more critical situations, example implementations may also help to prevent critical situations from arising. In a production facility where a manufacturing process is carried out, for example, it may be critical to maintain a certain temperature or humidity. Example implementations could help ensure that all areas of the production facility continue to operate within acceptable parameters, even if one of the conditioning pieces of equipment experiences a failure. In another example, a building could experience an equipment failure in an area that contains water pipes during the winter months during an unoccupied time. Example implementations could be used to instruct the other pieces of equipment near that area to increase their heat output, thus ensuring that the water pipes do not experience a freeze event.

The present disclosure thus includes, without limitation, the following example implementations.

Some example implementations provide a method of controlling heating, ventilation and air conditioning (HVAC) equipment configured to control environmental conditions in confined areas of a facility, the method comprising: monitoring at least one of the HVAC equipment or the confined areas; detecting a failure of a first of the HVAC equipment to control an environmental condition in a first of the confined areas to a setpoint for the environmental condition, the environmental condition including at least one of temperature, humidity or air quality; and controlling at least one of the first or a second of the HVAC equipment to cause additional conditioned air to permeate to the first of the confined areas from an adjacent, second of the confined areas to move the environmental condition in the first of the confined areas closer to the setpoint to compensate for the failure, automatically as a direct result of detection of the failure.

Some example implementations provide a method of controlling one or more environmental control equipment configured to control environmental conditions in confined areas of a facility, the method comprising: monitoring at least one of the environmental control equipment or the confined areas; detecting a failure of a first of the environmental control equipment to control an environmental condition in a first of the confined areas to a setpoint for the environmental condition; and controlling at least one of the first or a second of the environmental control equipment to cause a body of matter or radiation to permeate to the first of the confined areas from an adjacent, second of the confined areas to move the environmental condition in the first of the confined areas closer to the setpoint to compensate for the failure, automatically as a direct result of detection of the failure.

Some example implementations provide an apparatus for controlling HVAC or other environmental control equipment configured to control environmental conditions in confined areas of a facility, the apparatus comprising a memory configured to store computer-readable program code; and a processor configured to access the memory, and execute the computer-readable program code to cause the apparatus to at least perform the method of any preceding example implementation, or any combination of any preceding example implementations.

Some example implementations provide a computer-readable storage medium for controlling HVAC or other environmental control equipment configured to control environmental conditions in confined areas of a facility, the computer-readable storage medium being non-transitory and having computer-readable program code stored therein that, in response to execution by a processor, causes an apparatus to at least perform the method of any preceding example implementation, or any combination of any preceding example implementations.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," "observation" and similar terms may be at times used interchangeably.

Figure 1:
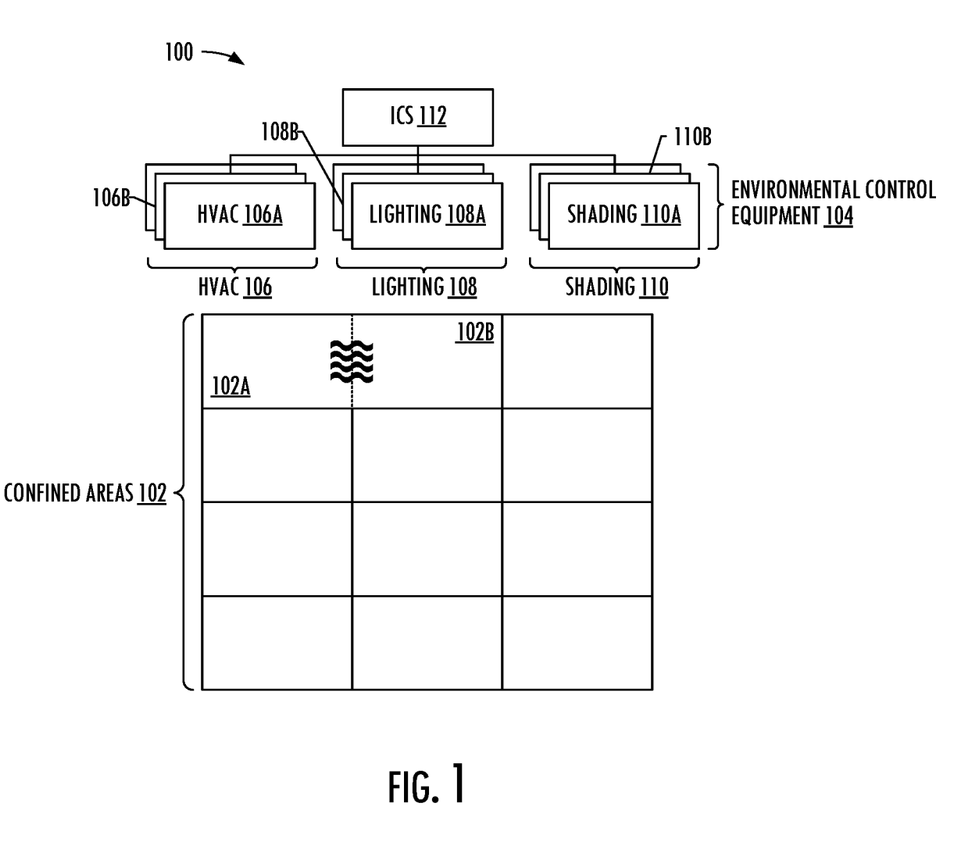
FIG. 1 illustrates a facility including environmental control equipment and an industrial control system (ICS), according to various example implementations of the present disclosure.

As indicated above, example implementations of the present disclosure are directed to control of environmental control equipment of a facility, and in particular, failure detection and compensation in HVAC equipment of a facility. FIG. 1 illustrates a facility 100 according to various example implementations of the present disclosure. The facility may be an industrial facility, institutional facility, commercial facility, residential facility and the like. In some examples, the facility includes one or more buildings such as industrial buildings, institutional buildings, commercial buildings, residential buildings and the like. Even further, examples of suitable commercial buildings include office buildings, warehouses, retail buildings and the like.

The facility 100 is generally any facility with confined areas 102 and environmental control equipment 104 configured to control environmental conditions in those confined areas. The environmental control equipment may include, for example, heating, ventilation and air conditioning (HVAC) equipment 106 such as an HVAC system and associated components such as air handling units, variable air volume (VAV) units, compressors, air movers, chillers, furnaces, and ventilators. Other examples of suitable environmental control equipment include lighting control equipment 108, shading control equipment 110, security systems, and other mechanical, electrical equipment. The facility also includes an industrial control system (ICS) 112 such as a supervisory control and data acquisition (SCADA) system, distributed control system (DCS) or the like. A more specific example of a suitable DCS is a building automation system (BAS). The ICS is configured to provide some level of computerized central control of at least some of the environmental control equipment within the facility.

Figure 2:
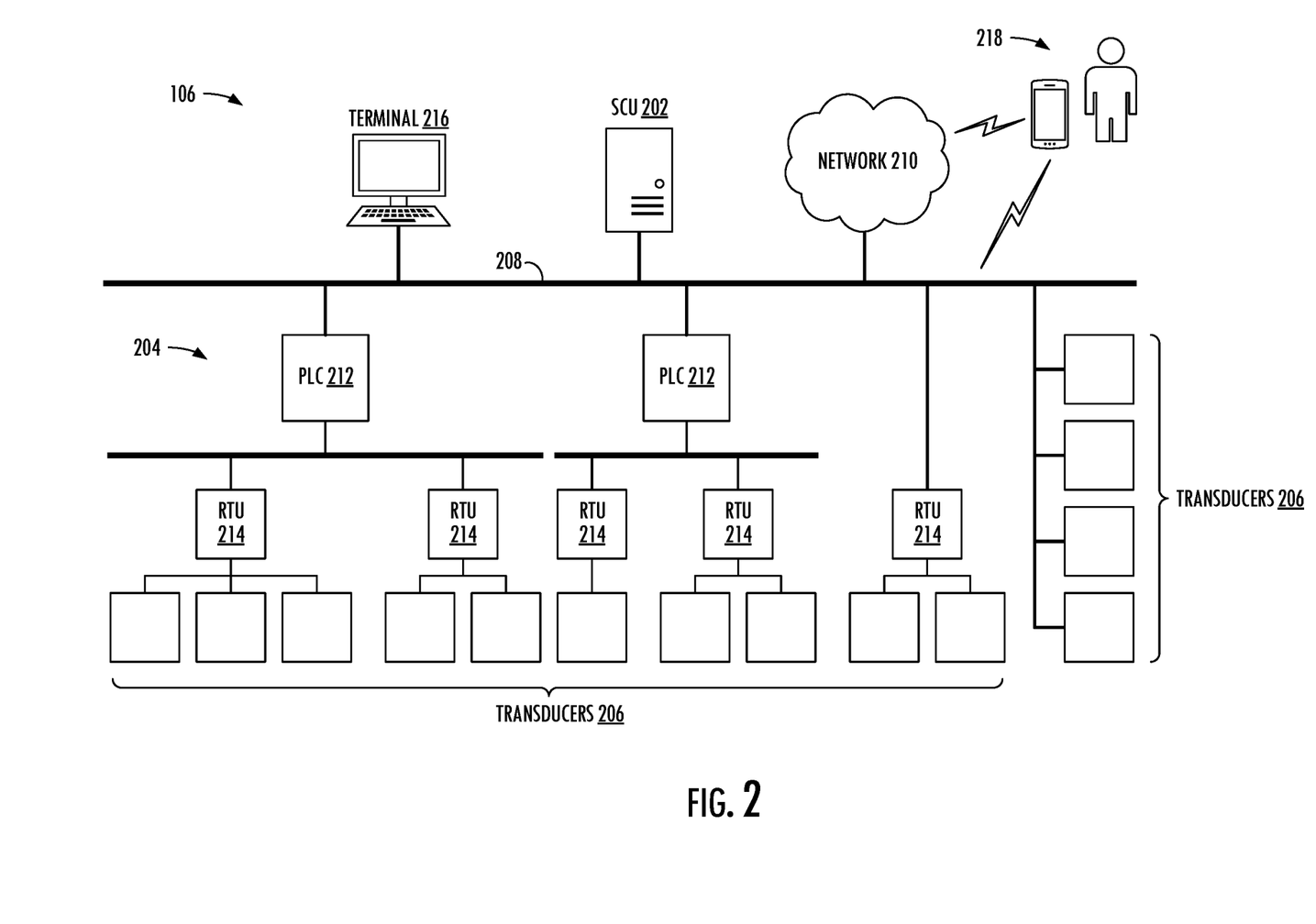
FIG. 2 more particularly illustrates the ICS, according to some example implementations.

FIG. 2 more particularly illustrates the ICS 112 according to some example implementations. As shown, the ICS includes the supervisory control unit (SCU) 202 configured to enable communication with and/or control of the environmental control equipment 104, such as by wired or wireless data links directly or across one or more networks. The ICS includes field connection units 204 to enable the SCU to communicate with the environmental control equipment, and in particular transducers 206 including actuators and/or sensors in the facility 100, some of which may be onboard the environmental control equipment.

The SCU 202 and the field connection units 204 may communicate by wired or wireless data links directly or across one or more networks, such as a control network 208. Examples of suitable communication protocols for the control network include TCP/IP, BACnet, LonTalk, Modbus, ZigBee, Zwave, Wi-Fi, SIMPLE, Bluetooth and the like. The control network may also be coupled to one or more networks 210 such as one or more telecommunications networks, computer networks or the like.

In some examples, the SCU 202 may be implemented as a supervisory computer, and the respective field connection units may be implemented as programmable logic controllers (PLCs) 212, remote terminal units (RTUs) 214, or some combination of PLCs and RTUs. The SCU may further communicate with a terminal 216 configured to provide a human-machine interface (HMI) to the SCU. The SCU may be integrated, co-located, or communicate with one or more of the field connection units and/or transducers 206 by wired or wireless data links directly or across the control network.

A facility operator 218 may access the ICS 112 in a number of different manners, such as via the terminal 216. As also shown, the facility operator may access the ICS from a user device such as a mobile device, handheld computer or the like. The user device may be configured to access the ICS from the control network 208 via a local wireless connection to the control network, or through the one or more networks 210.

The SCU 202 is configured to communicate with the transducers 206 for communication and/or control of the facility 100 and the environmental control equipment 104, such as to enable the SCU to control HVAC equipment 106, lighting control equipment 108, shading control equipment 110, security systems, and other mechanical, electrical equipment. In some particular examples, the transducers may include one or more actuators configured to control operation of environmental control equipment. The transducers may also include one or more environmental sensors such as temperature sensors, humidity sensors, gas sensors like $CO_2$ sensors, occupancy sensors and the like.

According to example implementations of the present disclosure, the SCU 202 is configured to monitor at least one of the environmental control equipment 104 or the confined areas 102. The SCU is configured to detect a failure of a first of the environmental control equipment 106A, 108A, 110A to control an environmental condition in a first of the confined areas 102A to a setpoint for the environmental condition. A failure generally includes any undesirable or unexpected change in performance of environmental control equipment that renders the environmental control equipment unable to reach or maintain the setpoint. For example, it is understood that wear on components of mechanical equipment affects reliability of the equipment if those components are not repaired or replaced prior to exceeding accepted tolerances.

The SCU 202 is configured to control at least one of the first or a second of the environmental control equipment 106B, 108B, 110B to cause a body of matter or radiation such as conditioned air or light to permeate to the first of the confined areas from an adjacent, second of the confined areas 102B. The SCU does this to move the environmental condition in the first of the confined areas 102A closer to the setpoint to compensate for the failure, automatically as a direct result of detection of the failure of the first of the environmental control equipment 106A, 108A, 110A.

In particular, in some examples, the SCU 202 is configured to monitor at least one of the HVAC equipment 106 or the confined areas 102. The SCU is configured to detect a failure of a first of the HVAC equipment 106A to control an environmental condition in a first of the confined areas 102A to a setpoint for the environmental condition. In some examples, this includes the SCU configured to receive a report of the failure from the first of the HVAC equipment. In the same or other examples, the SCU is configured to receive one or more measurements of the environmental condition in the first of the confined areas, and compare the one or more measurements to the setpoint from which the failure is detected.

Examples of suitable environmental conditions controllable by the HVAC equipment 106 include at least one of temperature, humidity or air quality (i.e., temperature, humidity, air quality or any combination thereof). The SCU 202, then, is configured to control at least one of the first or a second of the HVAC equipment to cause additional conditioned air to permeate to the first of the confined areas from an adjacent, second of the confined areas 102B to move the environmental condition in the first of the confined areas closer to the setpoint to compensate for the failure, automatically as a direct result of detection of the failure.

In some examples, the SCU 202 is configured to control the at least one of the first or the second of the HVAC equipment 106A, 106B, including the SCU configured to control the first of the HVAC equipment to reduce air pressure in the first of the confined areas 102A, and thereby draw additional conditioned air to the first of the confined areas from the adjacent, second of the confined areas 102B. Additionally or alternatively, in some examples, the SCU is configured to control the second of the HVAC equipment to produce additional conditioned air in the adjacent, second of the confined areas 102B, the additional conditioned air caused to permeate to the first of the confined areas 102A.

In some examples, the SCU 202 is further configured to perform an evaluation of the states of barriers such as doors that directly or indirectly allow ingress into and egress from the first of the confined areas 102A. The evaluation is performed to determine the second of the HVAC equipment 106B configured to control the environmental condition in the second of the confined areas 102B having more open pathways for additional conditioned air to permeate to the first of the confined areas from the second of the confined areas relative to others of the confined areas. In some of these examples, the at least one of the first or the second of the HVAC equipment is controlled based on the evaluation.

In some examples, the SCU 202 is further configured to monitor the first of the confined areas 102A as the at least one of the first or the second of the HVAC equipment 106A, 106B is controlled to compensate for the failure. The SCU is configured to determine failure of the environmental condition in the first of the confined areas to move at least a threshold amount closer to the setpoint within a specified time period. And the SCU is configured to perform a further action in response to the failure of the environmental condition to move at least the threshold amount closer to the setpoint.

In some examples, the SCU 202 is configured to perform further action including the SCU being configured to cease control of the at least one of the first or the second of the HVAC equipment 106A, 106B to compensate for the failure. In some examples, the SCU is configured to notify a facility operator 218 of at least one of the failure of the first of the HVAC equipment or the failure of the environmental condition to move at least the threshold amount closer to the setpoint. And in some examples, the SCU configured to control access control equipment in the facility to control one or more barriers that directly or indirectly allow ingress into and egress from the first of the confined areas 102A or the second of the confined areas 102B to facilitate permeation of the additional conditioned air to the first of the confined areas.

In addition to or in lieu of the HVAC equipment 106, the SCU 202 may be configured to monitor other of the environmental control equipment 104. In some examples, the environmental control equipment includes at least one of lighting control equipment 108 or shading control equipment 110, and the environmental condition includes lighting. In some of these examples, the SCU is configured to detect the failure of a first of the lighting control equipment or the shading control equipment 108A, 110A to control the lighting in the first of the confined areas 102A to the setpoint. In this regard, the SCU is configured to control at least one of the first or a second of the lighting control equipment or the shading control equipment 108B, 110B to cause light to permeate to the first of the confined areas from an adjacent, second of the confined areas 102B to move the lighting in the first of the confined areas closer to the setpoint to compensate for the failure, automatically as a direct result of detection of the failure.

In some examples, the environmental control equipment 104 includes shading control equipment 110, and the environmental condition includes temperature. In some of these examples, the SCU 202 is configured to detect the failure of a first of the shading control equipment 110A to control the environmental condition in the first of the confined areas 102A to the setpoint. In particular, the SCU is configured to control at least one of the first or a second of the shading control equipment 110B to cause thermal radiation to permeate to the first of the confined areas from an adjacent, second of the confined areas 102B to move the temperature in the first of the confined areas closer to the setpoint to compensate for the failure, automatically as a direct result of detection of the failure.

Figure 3:
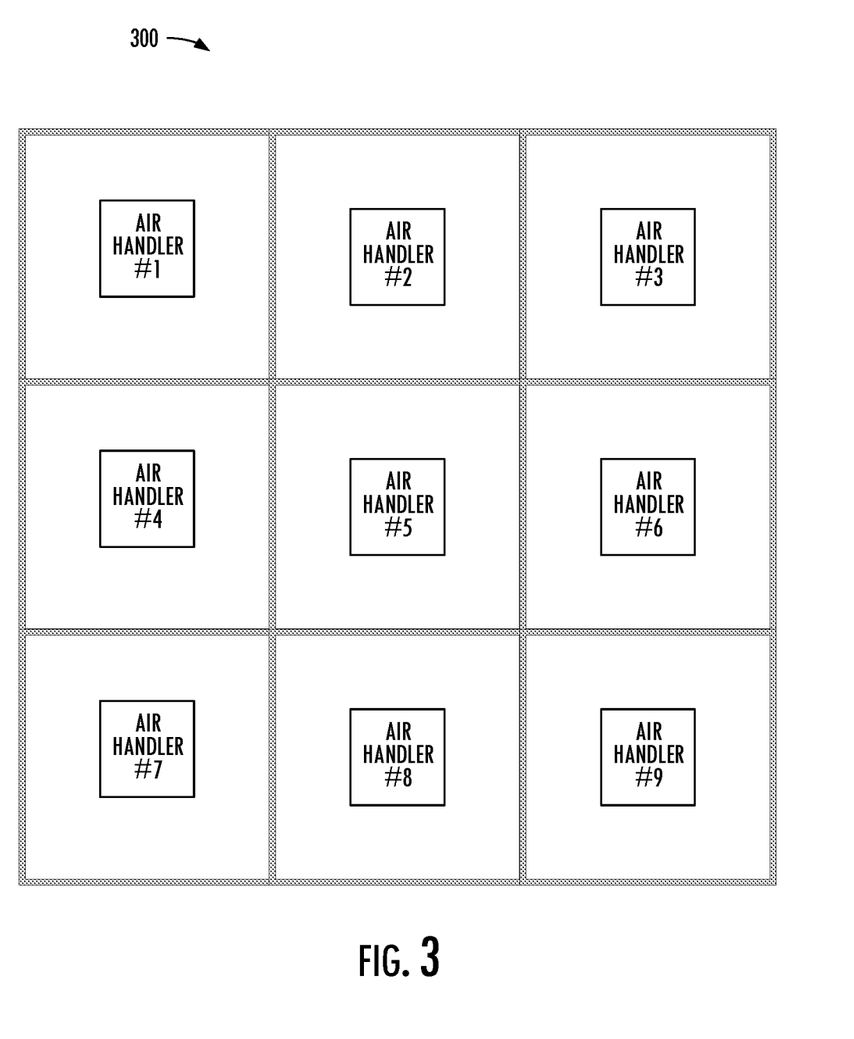
FIG. 3 illustrates a manufacturing facility served by an arrangement of rooftop air handlers, according to some example implementations.

To further illustrate at least some example implementations of the present disclosure, FIG. 3 shows a manufacturing facility 300 served by an arrangement of rooftop air handlers including air handler #1-air handler #9, according to some example implementations. As shown, the air handlers are arranged in a three-by-three grid. Also assume that when commissioned, air handlers #2 and #4 border air handler #1; air handlers #1, #3 and #5 border air handler #2; and so forth. In this arrangement, say that air handler #1 experiences a failure in its cooling unit during the summer.

During normal operation, the confined area served by air handler #1 may experience a deviation from setpoint as the air starts to warm, and during summer, the humidity may also increase. If this deviation gets large enough, the temperature in the confined area served by air handler #1 may get to the point where part of the manufacturing line has to be shut down because the temperature and/or humidity is outside that required by the manufacturing process.

According to example implementations, the SCU may detect the failure (either directly through diagnostics messages, or empirically through various space sensor measurements) and begin to take action. If the fan and any dampers are still operational in air handler #1, the SCU may operate the HVAC equipment in a mode in which the air pressure in the confined area served by air handler #1 is slightly lower than other confined areas. This may help draw air from adjacent confined areas into the impacted space. Additionally or alternatively, other adjacent air handlers (e.g., air handlers #2 and #4) may be controlled to provide additional cooling to help compensate for the load that was serviced by air handler #1. In this scenario, the confined areas served by air handlers #2 and #4 may experience air that is a little cooler, and the confined area served by defective air handler #1 may experience air that is a little warmer; but overall, confined areas may remain within the specification for the manufacturing process.

The SCU may also monitor the impact of the above actions. If the confined area served by air handler #1 fails to show signs of improvement in the environmental conditions within a pre-defined period, air handlers #2 and #4 may return to normal operation, thus not wasting energy in an attempt to compensate for a deviation that cannot be addressed. This may be the case in an office situation where there may be doors or barriers closed that prevent the air from moving from one confined area to another. In this situation, the HVAC equipment (except air handler #1) may be returned to normal operation. Additionally or alternatively, a message may be sent to the building operator instructing them to take the necessary steps to allow the compensation to be effective. The SCU may even automatically open doors to allow the compensation to be effective. Even further, the SCU may automatically evaluate the current state of various doors/barriers and control the air handlers with the most available interaction with the impacted confined area, thus not wasting energy driving air handlers that may not be able to affect the confined area experiencing the issue.

FIGS. 4A-4F are flowcharts illustrating various steps in a method 400 of controlling heating, ventilation and air conditioning (HVAC) equipment configured to control environmental conditions in confined areas of a facility, according to various example implementations of the present disclosure. As shown, the method includes monitoring at least one of the HVAC equipment or the confined areas, as shown at block 402 of FIG. 4A. The method includes detecting a failure of a first of the HVAC equipment to control an environmental condition in a first of the confined areas to a setpoint for the environmental condition, the environmental condition including at least one of temperature, humidity or air quality, as shown at block 404. And the method includes controlling at least one of the first or a second of the HVAC equipment to cause additional conditioned air to permeate to the first of the confined areas from an adjacent, second of the confined areas to move the environmental condition in the first of the confined areas closer to the setpoint to compensate for the failure, automatically as a direct result of detection of the failure, as shown at block 406.

Figure 4A:
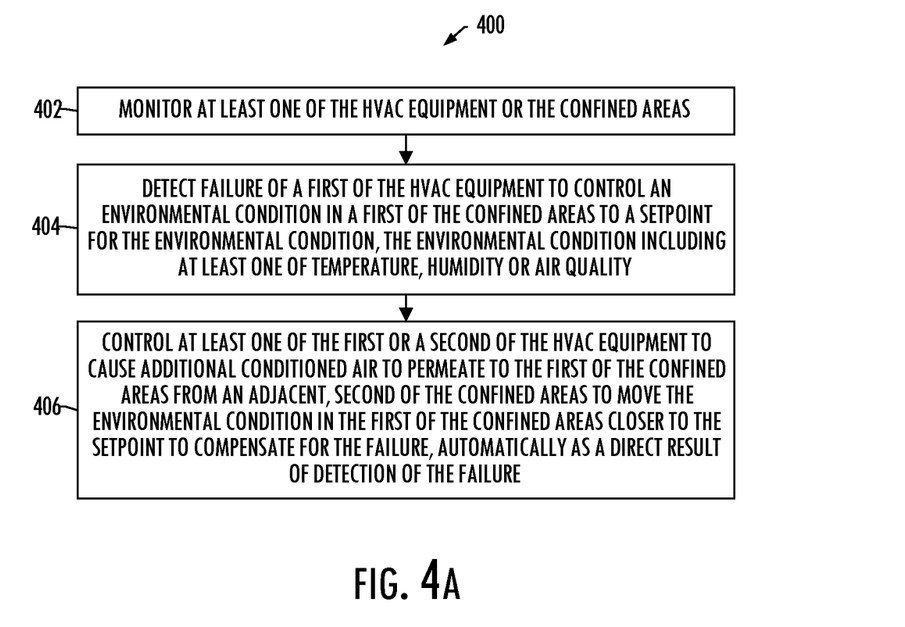
FIGS. 4A, 4B, 4C, 4D, 4E and 4F are flowcharts illustrating various steps in a method of controlling heating, ventilation and air conditioning (HVAC) equipment, according to various example implementations of the present disclosure.
Figure 4B:
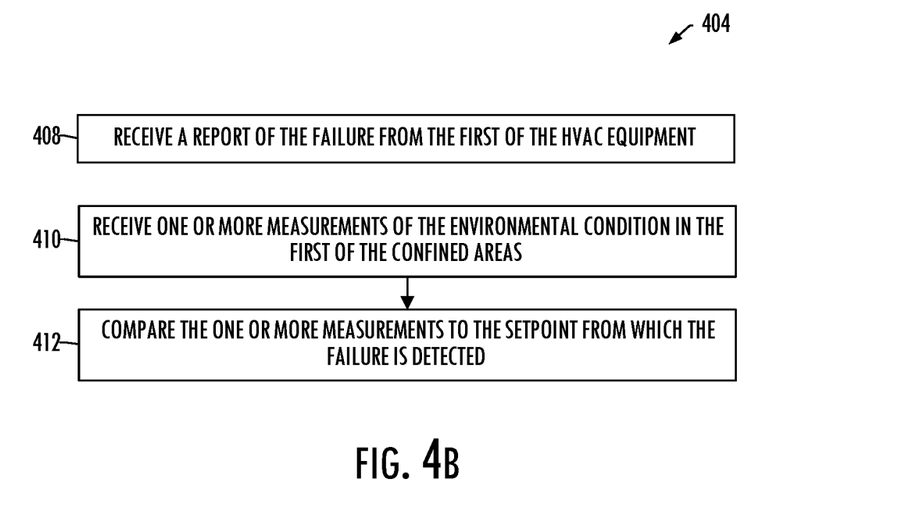

In some examples, detecting the failure at block 404 includes receiving a report of the failure from the first of the HVAC equipment, as shown at block 408 of FIG. 4B.

In some examples, detecting the failure at block 404 includes receiving one or more measurements of the environmental condition in the first of the confined areas, as shown at block 410. In some of these examples, the method 400 includes comparing the one or more measurements to the setpoint from which the failure is detected, as shown at block 412.

Figure 4C:
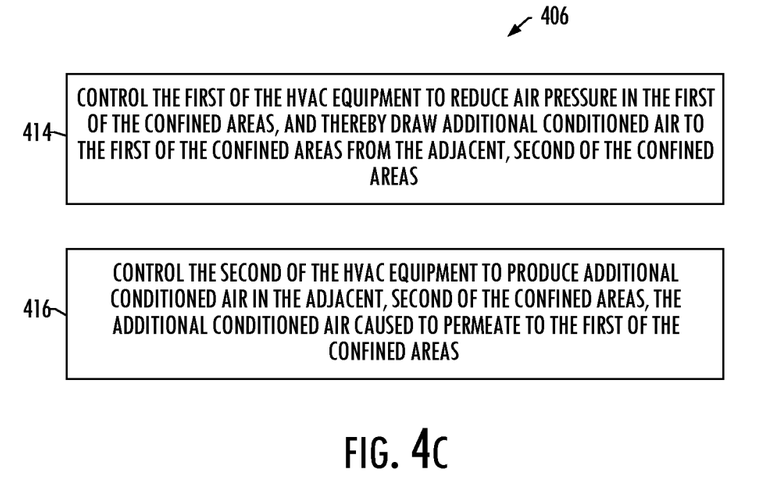

In some examples, controlling the at least one of the first or the second of the HVAC equipment at block 406 includes controlling the first of the HVAC equipment to reduce air pressure in the first of the confined areas, and thereby draw additional conditioned air to the first of the confined areas from the adjacent, second of the confined areas, as shown at block 414 of FIG. 4C.

In some examples, controlling the at least one of the first or the second of the HVAC equipment at block 406 includes controlling the second of the HVAC equipment to produce additional conditioned air in the adjacent, second of the confined areas, the additional conditioned air caused to permeate to the first of the confined areas, as shown at block 416.

Figure 4D:
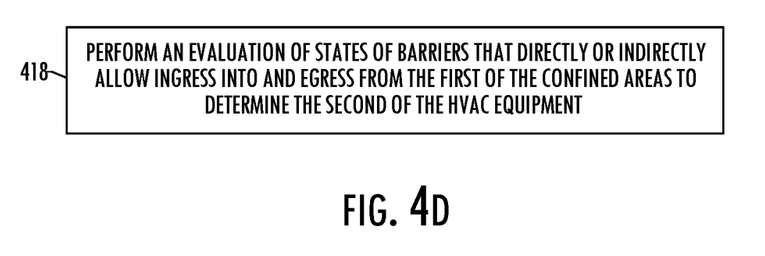

In some examples, the method 400 further includes performing an evaluation of the states of barriers that directly or indirectly allow ingress into and egress from the first of the confined areas, as shown at block 418 of FIG. 4D. The evaluation is performed to determine the second of the HVAC equipment configured to control the environmental condition in the second of the confined areas having more open pathways for additional conditioned air to permeate to the first of the confined areas from the second of the confined areas relative to others of the confined areas. And in some of these examples, the at least one of the first or the second of the HVAC equipment is controlled based on the evaluation.

Figure 4E:
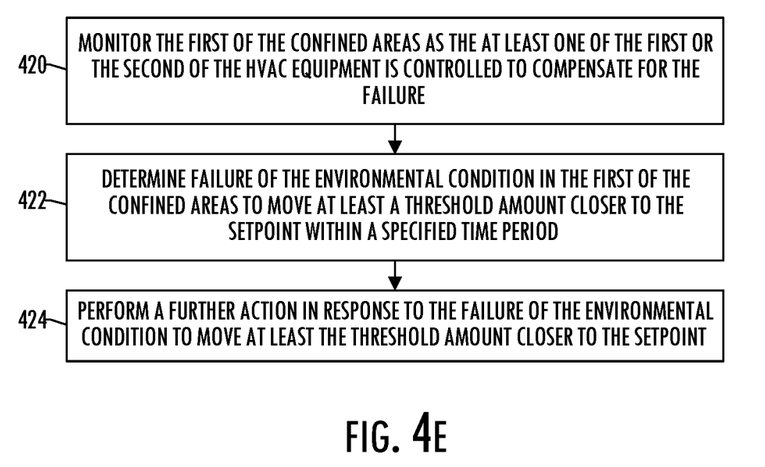

In some examples, the method 400 further includes monitoring the first of the confined areas as the at least one of the first or the second of the HVAC equipment is controlled to compensate for the failure, as shown at block 420 of FIG. 4E. The method includes determining failure of the environmental condition in the first of the confined areas to move at least a threshold amount closer to the setpoint within a specified time period, as shown at block 422. And the method includes performing a further action in response to the failure of the environmental condition to move at least the threshold amount closer to the setpoint, as shown at block 424.

Figure 4F:
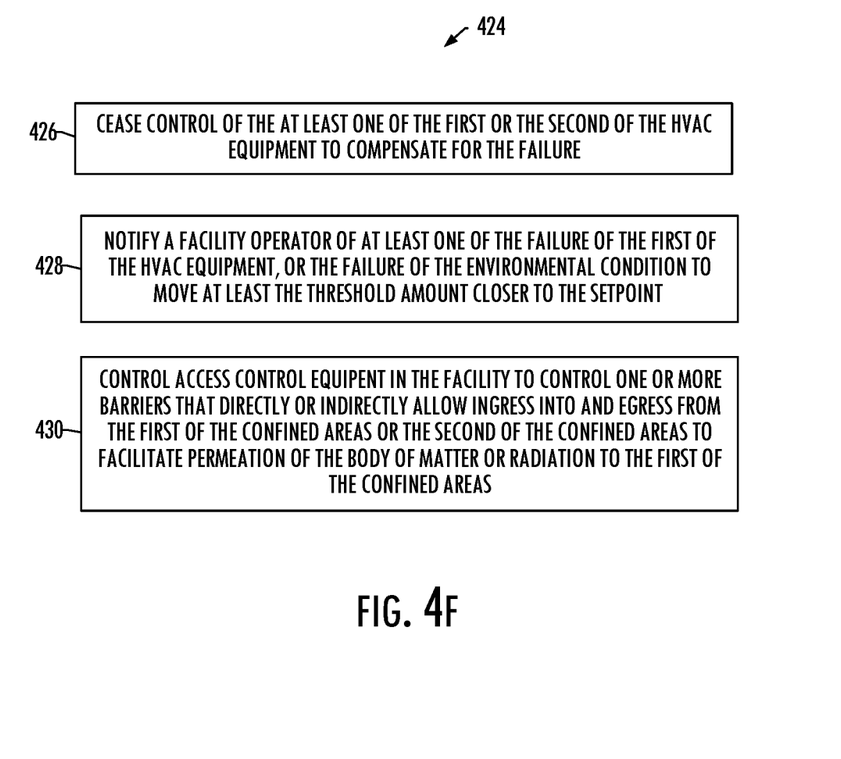

In some examples, performing the further action at block 424 includes ceasing control of the at least one of the first or the second of the HVAC equipment to compensate for the failure, as shown at block 426 of FIG. 4F.

In some examples, performing the further action at block 424 includes notifying a facility operator of at least one of the failure of the first of the HVAC equipment or the failure of the environmental condition to move at least the threshold amount closer to the setpoint, as shown at block 428.

In some examples, performing the further action at block 424 includes controlling access control equipment in the facility to control one or more barriers that directly or indirectly allow ingress into and egress from the first of the confined areas or the second of the confined areas to facilitate permeation of the additional conditioned air to the first of the confined areas, as shown at block 430.

According to example implementations of the present disclosure, components of the ICS 112 including the SCU 202, the field connection units 204 including the PLCs 212 and RTUs 214, and the terminal 216 may be implemented by various means. Means for implementing these components may include hardware, alone or under direction of one or more computer programs from a computer-readable storage medium. In some examples, one or more apparatuses may be configured to function as or otherwise implement one or more of the components shown and described herein. In examples involving more than one apparatus, the respective apparatuses may be connected to or otherwise in communication with one another in a number of different manners, such as directly or indirectly via a wired or wireless network or the like.

Figure 5:
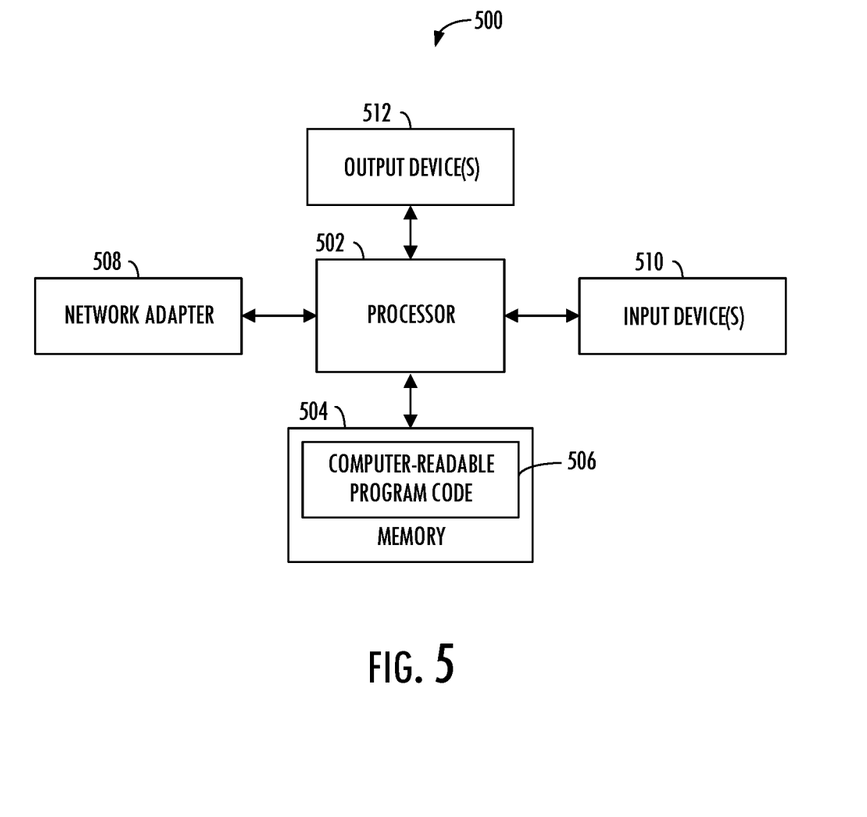
FIG. 5 illustrates an apparatus according to some example implementations.

FIG. 5 illustrates an apparatus 500 according to some example implementations of the present disclosure. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer, PLC, circuit board or the like. The apparatus may include one or more of each of a number of components such as, for example, a processor 502 connected to a memory 504.

The processor 502 is generally any piece of computer hardware capable of processing information such as, for example, data, computer programs and/or other suitable electronic information. The processor includes one or more electronic circuits some of which may be packaged as an integrated circuit or multiple interconnected integrated circuits (an integrated circuit at times more commonly referred to as a "chip"). The processor may be a number of processors, a multi-core processor or some other type of processor, depending on the particular implementation.

The processor 502 may be configured to execute computer programs such as computer-readable program code 506, which may be stored onboard the processor or otherwise stored in the memory 504. In some examples, the processor may be embodied as or otherwise include one or more ASICs, FPGAs or the like. Thus, although the processor may be capable of executing a computer program to perform one or more functions, the processor of various examples may be capable of performing one or more functions without the aid of a computer program.

The memory 504 is generally any piece of computer hardware capable of storing information such as, for example, data, computer-readable program code 506 or other computer programs, and/or other suitable information either on a temporary basis and/or a permanent basis. The memory may include volatile memory such as random access memory (RAM), and/or non-volatile memory such as a hard drive, flash memory or the like. In various instances, the memory may be referred to as a computer-readable storage medium, which is a non-transitory device capable of storing information. In some examples, then, the computer-readable storage medium is non-transitory and has computer-readable program code stored therein that, in response to execution by the processor 502, causes the apparatus 500 to perform various operations as described herein, some of which may in turn cause the environmental control equipment 104 to perform various operations.

In addition to the memory 504, the processor 502 may also be connected to one or more peripherals such as a network adapter 508, one or more input/output (I/O) devices or the like. The network adapter is a hardware component configured to connect the apparatus 500 to one or more networks to enable the apparatus to transmit and/or receive information via the one or more networks. This may include transmission and/or reception of information via one or more networks through a wired or wireless connection using Wi-Fi, Bluetooth, BACnet, LonTalk, Modbus, ZigBee, Zwave, or the like, or other suitable wired or wireless communication protocols.

The I/O devices may include one or more input devices 510 capable of receiving data or instructions for the apparatus 500, and/or one or more output devices 512 capable of providing an output from the apparatus. Examples of suitable input devices include a keyboard, keypad or the like, and examples of suitable output devices include a display device such as a one or more light-emitting diodes (LEDs), a LED display, a liquid crystal display (LCD), or the like.

As explained above and reiterated below, the present disclosure includes, without limitation, the following example implementations.

Clause 1. An apparatus for controlling one or more environmental control equipment configured to control environmental conditions in confined areas of a facility, the apparatus comprising a memory configured to store computer-readable program code; and processing circuitry configured to access the memory, and execute the computer-readable program code to cause the apparatus to at least: monitor at least one of the environmental control equipment or the confined areas; detect a failure of a first of the environmental control equipment to control an environmental condition in a first of the confined areas to a setpoint for the environmental condition; and control at least one of the first or a second of the environmental control equipment to cause a body of matter or radiation to permeate to the first of the confined areas from an adjacent, second of the confined areas to move the environmental condition in the first of the confined areas closer to the setpoint to compensate for the failure, automatically as a direct result of detection of the failure.

Clause 2. The apparatus of clause 1, wherein the apparatus caused to detect the failure includes the apparatus caused to receive a report of the failure from the first of the environmental control equipment.

Clause 3. The apparatus of clause 1 or clause 2, wherein the apparatus caused to detect the failure includes the apparatus caused to: receive one or more measurements of the environmental condition in the first of the confined areas; and compare the one or more measurements to the setpoint from which the failure is detected.

Clause 4. The apparatus of any of clauses 1 to 3, wherein the processing circuitry is configured to execute the computer-readable program code to cause the apparatus to further at least: monitor the first of the confined areas as the at least one of the first or the second of the environmental control equipment is controlled to compensate for the failure; determine failure of the environmental condition in the first of the confined areas to move at least a threshold amount closer to the setpoint within a specified time period; and perform a further action in response to the failure of the environmental condition to move at least the threshold amount closer to the setpoint.

Clause 5. The apparatus of clause 4, wherein the apparatus caused to perform the further action includes the apparatus caused to cease control of the at least one of the first or the second of the environmental control equipment to compensate for the failure.

Clause 6. The apparatus of clause 4 or clause 5, wherein the apparatus caused to perform the further action includes the apparatus caused to notify a facility operator of at least one of the failure of the first of the environmental control equipment, or the failure of the environmental condition to move at least the threshold amount closer to the setpoint.

Clause 7. The apparatus of any of clauses 4 to 6, wherein the apparatus caused to perform the further action includes the apparatus caused to control access control equipment in the facility to control one or more barriers that directly or indirectly allow ingress into and egress from the first of the confined areas or the second of the confined areas to facilitate permeation of the body of matter or radiation to the first of the confined areas.

Clause 8. The apparatus of any of clauses 1 to 7, wherein the environmental control equipment includes heating, ventilation and air conditioning (HVAC) equipment, and the environmental condition includes at least one of temperature, humidity or air quality, and wherein the apparatus caused to detect the failure of the first of the environmental control equipment includes the apparatus caused to detect the failure of a first of the HVAC equipment to control the environmental condition to the setpoint.

Clause 9. The apparatus of clause 8, wherein the apparatus caused to control the at least one of the first or the second of the environmental control equipment includes the apparatus caused to control the first of the HVAC equipment to reduce air pressure in the first of the confined areas, and thereby draw additional conditioned air to the first of the confined areas from the adjacent, second of the confined areas.

Clause 10. The apparatus of clause 8 or clause 9, wherein the apparatus caused to control the at least one of the first or the second of the environmental control equipment includes the apparatus caused to control the second of the HVAC equipment to produce additional conditioned air in the adjacent, second of the confined areas, the additional conditioned air caused to permeate to the first of the confined areas.

Clause 11. The apparatus of any of clauses 8 to 10, wherein the processing circuitry is configured to execute the computer-readable program code to cause the apparatus to further at least: perform an evaluation of states of barriers that directly or indirectly allow ingress into and egress from the first of the confined areas to determine the second of the HVAC equipment configured to control the environmental condition in the second of the confined areas having more open pathways for additional conditioned air to permeate to the first of the confined areas from the second of the confined areas relative to others of the confined areas, wherein the at least one of the first or the second of the environmental control equipment is controlled based on the evaluation.

Clause 12. The apparatus of any of clauses 1 to 11, wherein the environmental control equipment includes at least one of lighting control equipment or shading control equipment and the environmental condition includes lighting, and wherein the apparatus caused to detect the failure of the first of the environmental control equipment includes the apparatus caused to detect the failure of a first of the lighting control equipment or the shading control equipment to control the lighting in the first of the confined areas to the setpoint.

Clause 13. The apparatus of any of clauses 1 to 12, wherein the environmental control equipment includes shading control equipment, and the environmental condition includes temperature, and wherein the apparatus caused to detect the failure of the first of the environmental control equipment includes the apparatus caused to detect the failure of a first of the shading control equipment to control the environmental condition in the first of the confined areas to the setpoint.

Clause 14. A method of controlling one or more environmental control equipment configured to control environmental conditions in confined areas of a facility, the method comprising: monitoring at least one of the environmental control equipment or the confined areas; detecting a failure of a first of the environmental control equipment to control an environmental condition in a first of the confined areas to a setpoint for the environmental condition; and controlling at least one of the first or a second of the environmental control equipment to cause a body of matter or radiation to permeate to the first of the confined areas from an adjacent, second of the confined areas to move the environmental condition in the first of the confined areas closer to the setpoint to compensate for the failure, automatically as a direct result of detection of the failure.

Clause 15. The method of clause 14, wherein detecting the failure includes receiving a report of the failure from the first of the environmental control equipment.

Clause 16. The method of clause 14 or clause 15, wherein detecting the failure comprises: receiving one or more measurements of the environmental condition in the first of the confined areas; and comparing the one or more measurements to the setpoint from which the failure is detected.

Clause 17. The method of any of clauses 14 to 16 further comprising: monitoring the first of the confined areas as the at least one of the first or the second of the environmental control equipment is controlled to compensate for the failure; determining failure of the environmental condition in the first of the confined areas to move at least a threshold amount closer to the setpoint within a specified time period;

and performing a further action in response to the failure of the environmental condition to move at least the threshold amount closer to the setpoint.

Clause 18. The method of clause 17, wherein performing the further action includes ceasing control of the at least one of the first or the second of the environmental control equipment to compensate for the failure.

Clause 19. The method of clause 17 or clause 18, wherein performing the further action includes notifying a facility operator of at least one of the failure of the first of the environmental control equipment, or the failure of the environmental condition to move at least the threshold amount closer to the setpoint.

Clause 20. The method of any of clauses 17 to 19, wherein performing the further action includes controlling access control equipment in the facility to control one or more barriers that directly or indirectly allow ingress into and egress from the first of the confined areas or the second of the confined areas to facilitate permeation of the body of matter or radiation to the first of the confined areas.

Clause 21. The method of any of clauses 14 to 20, wherein the environmental control equipment includes heating, ventilation and air conditioning (HVAC) equipment, and the environmental condition includes at least one of temperature, humidity or air quality, and wherein detecting the failure of the first of the environmental control equipment includes detecting the failure of a first of the HVAC equipment to control the environmental condition to the setpoint.

Clause 22. The method of clause 21, wherein controlling the at least one of the first or the second of the environmental control equipment includes controlling the first of the HVAC equipment to reduce air pressure in the first of the confined areas, and thereby draw additional conditioned air to the first of the confined areas from the adjacent, second of the confined areas.

Clause 23. The method of clause 21 or clause 22, wherein controlling the at least one of the first or the second of the environmental control equipment includes controlling the second of the HVAC equipment to produce additional conditioned air in the adjacent, second of the confined areas, the additional conditioned air caused to permeate to the first of the confined areas.

Clause 24. The method of any of clauses 21 to 23 further comprising: performing an evaluation of states of barriers that directly or indirectly allow ingress into and egress from the first of the confined areas to determine the second of the HVAC equipment configured to control the environmental condition in the second of the confined areas having more open pathways for additional conditioned air to permeate to the first of the confined areas from the second of the confined areas relative to others of the confined areas, wherein the at least one of the first or the second of the environmental control equipment is controlled based on the evaluation.

Clause 25. The method of any of clauses 14 to 24, wherein the environmental control equipment includes at least one of lighting control equipment or shading control equipment and the environmental condition includes lighting, and wherein detecting the failure of the first of the environmental control equipment includes detecting the failure of a first of the lighting control equipment or the shading control equipment to control the lighting in the first of the confined areas to the setpoint.

Clause 26. The method of any of clauses 14 to 25, wherein the environmental control equipment includes shading control equipment, and the environmental condition includes temperature, and wherein detecting the failure of the first of the environmental control equipment includes detecting the failure of a first of the shading control equipment to control the environmental condition in the first of the confined areas to the setpoint.

Clause 27. An apparatus for controlling heating, ventilation and air conditioning (HVAC) equipment configured to control environmental conditions in confined areas of a facility, the apparatus comprising: a memory configured to store computer-readable program code; and processing circuitry configured to access the memory, and execute the computer-readable program code to cause the apparatus to at least: monitor at least one of the HVAC equipment or the confined areas; detect a failure of a first of the HVAC equipment to control an environmental condition in a first of the confined areas to a setpoint for the environmental condition, the environmental condition including at least one of temperature, humidity or air quality; and control at least one of the first or a second of the HVAC equipment to cause additional conditioned air to permeate to the first of the confined areas from an adjacent, second of the confined areas to move the environmental condition in the first of the confined areas closer to the setpoint to compensate for the failure, automatically as a direct result of detection of the failure.

Clause 28. The apparatus of clause 27, wherein the apparatus caused to detect the failure includes the apparatus caused to receive a report of the failure from the first of the HVAC equipment.

Clause 29. The apparatus of clause 27 or clause 28, wherein the apparatus caused to detect the failure includes the apparatus caused to: receive one or more measurements of the environmental condition in the first of the confined areas; and compare the one or more measurements to the setpoint from which the failure is detected.

Clause 30. The apparatus of any of clauses 27 to 29, wherein the apparatus caused to control the at least one of the first or the second of the HVAC equipment includes the apparatus caused to control the first of the HVAC equipment to reduce air pressure in the first of the confined areas, and thereby draw additional conditioned air to the first of the confined areas from the adjacent, second of the confined areas.

Clause 31. The apparatus of any of clauses 27 to 30, wherein the apparatus caused to control the at least one of the first or the second of the HVAC equipment includes the apparatus caused to control the second of the HVAC equipment to produce additional conditioned air in the adjacent, second of the confined areas, the additional conditioned air caused to permeate to the first of the confined areas.

Clause 32. The apparatus of any of clauses 27 to 31, wherein the processing circuitry is configured to execute the computer-readable program code to cause the apparatus to further at least: perform an evaluation of states of barriers that directly or indirectly allow ingress into and egress from the first of the confined areas to determine the second of the HVAC equipment configured to control the environmental condition in the second of the confined areas having more open pathways for additional conditioned air to permeate to the first of the confined areas from the second of the confined areas relative to others of the confined areas, wherein the at least one of the first or the second of the HVAC equipment is controlled based on the evaluation.

Clause 33. The apparatus of any of clauses 27 to 32, wherein the processing circuitry is configured to execute the computer-readable program code to cause the apparatus to further at least: monitor the first of the confined areas as the at least one of the first or the second of the HVAC equipment is controlled to compensate for the failure; determine failure of the environmental condition in the first of the confined areas to move at least a threshold amount closer to the setpoint within a specified time period; and perform a further action in response to the failure of the environmental condition to move at least the threshold amount closer to the setpoint.

Clause 34. The apparatus of clause 33, wherein the apparatus caused to perform the further action includes the apparatus caused to cease control of the at least one of the first or the second of the HVAC equipment to compensate for the failure.

Clause 35. The apparatus of clause 33 or clause 34, wherein the apparatus caused to perform the further action includes the apparatus caused to notify a facility operator of at least one of the failure of the first of the HVAC equipment, or the failure of the environmental condition to move at least the threshold amount closer to the setpoint.

Clause 36. The apparatus of any of clauses 33 to 35, wherein the apparatus caused to perform the further action includes the apparatus caused to control access control equipment in the facility to control one or more barriers that directly or indirectly allow ingress into and egress from the first of the confined areas or the second of the confined areas to facilitate permeation of the additional conditioned air to the first of the confined areas.

Clause 37. A method of controlling heating, ventilation and air conditioning (HVAC) equipment configured to control environmental conditions in confined areas of a facility, the method comprising: monitoring at least one of the HVAC equipment or the confined areas; detecting a failure of a first of the HVAC equipment to control an environmental condition in a first of the confined areas to a setpoint for the environmental condition, the environmental condition including at least one of temperature, humidity or air quality; and controlling at least one of the first or a second of the HVAC equipment to cause additional conditioned air to permeate to the first of the confined areas from an adjacent, second of the confined areas to move the environmental condition in the first of the confined areas closer to the setpoint to compensate for the failure, automatically as a direct result of detection of the failure.

Clause 38. The method of clause 37, wherein detecting the failure includes receiving a report of the failure from the first of the HVAC equipment.

Clause 39. The method of clause 37 or clause 38, wherein detecting the failure comprises: receiving one or more measurements of the environmental condition in the first of the confined areas; and comparing the one or more measurements to the setpoint from which the failure is detected.

Clause 40. The method of any of clauses 37 to 39, wherein controlling the at least one of the first or the second of the HVAC equipment includes controlling the first of the HVAC equipment to reduce air pressure in the first of the confined areas, and thereby draw additional conditioned air to the first of the confined areas from the adjacent, second of the confined areas.

Clause 41. The method of any of clauses 37 to 40, wherein controlling the at least one of the first or the second of the HVAC equipment includes controlling the second of the HVAC equipment to produce additional conditioned air in the adjacent, second of the confined areas, the additional conditioned air caused to permeate to the first of the confined areas.

Clause 42. The method of any of clauses 37 to 41 further comprising: performing an evaluation of states of barriers that directly or indirectly allow ingress into and egress from the first of the confined areas to determine the second of the HVAC equipment configured to control the environmental condition in the second of the confined areas having more open pathways for additional conditioned air to permeate to the first of the confined areas from the second of the confined areas relative to others of the confined areas, wherein the at least one of the first or the second of the HVAC equipment is controlled based on the evaluation.

Clause 43. The method of any of clauses 37 to 42 further comprising: monitoring the first of the confined areas as the at least one of the first or the second of the HVAC equipment is controlled to compensate for the failure; determining failure of the environmental condition in the first of the confined areas to move at least a threshold amount closer to the setpoint within a specified time period; and performing a further action in response to the failure of the environmental condition to move at least the threshold amount closer to the setpoint.

Clause 44. The method of clause 43, wherein performing the further action includes ceasing control of the at least one of the first or the second of the HVAC equipment to compensate for the failure.

Clause 45. The method of clause 43 or clause 44, wherein performing the further action includes notifying a facility operator of at least one of the failure of the first of the HVAC equipment, or the failure of the environmental condition to move at least the threshold amount closer to the setpoint.

Clause 46. The method of any of clauses 43 to 45, wherein performing the further action includes controlling access control equipment in the facility to control one or more barriers that directly or indirectly allow ingress into and egress from the first of the confined areas or the second of the confined areas to facilitate permeation of the additional conditioned air to the first of the confined areas.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for controlling heating, ventilation and air conditioning (HVAC) equipment, the apparatus comprising:
   a memory configured to store computer-readable program code, wherein
      the apparatus is configured to control environmental conditions in a plurality of confined areas of a facility by controlling a plurality of HVAC units of the HVAC equipment; and
   processing circuitry configured to access the memory, and execute the computer-readable program code to cause the apparatus to at least monitor at least one or more of the plurality of HVAC units and/or one or more of the plurality of confined areas;

detect a failure of a first HVAC unit of the plurality of HVAC units to control an environmental condition within a first confined area of the plurality of confined areas to a setpoint for the environmental condition, wherein the environmental condition comprises at least one of a temperature within the first confined area, a humidity within the first confined area, or an air quality within the first confined area; and in response to detection of the failure, automatically control at least one of the first HVAC unit and/or a second HVAC unit of the plurality of HVAC units to cause additional conditioned air to permeate into the first confined area from a second confined area of the plurality of confined areas, at least in part, via a pathway between the first confined area and the second confined area, wherein the flow of the additional conditioned air via the pathway is affected by a barrier, the automatic control of the at least one of the first HVAC unit and/or the second HVAC unit is based, at least in part on an evaluation of a state of the barrier, the second confined area is adjacent to the first confined area, and the additional conditioned air compensates for the failure, at least in part, by moving the environmental condition in the first confined area closer to the setpoint, and automatically control a third HVAC unit of the plurality of HVAC units to maintain another environmental condition in a third confined area of the plurality of confined areas at another setpoint, wherein the third confined area is not adjacent to the first confined area, and the another environmental condition comprises at least one of a temperature within the third confined area, a humidity within the third confined area, or an air quality within the third confined area.

2. The apparatus of claim 1, wherein the apparatus caused to detect the failure includes the apparatus caused to receive a report of the failure from the first HVAC unit.

3. The apparatus of claim 1, wherein the apparatus caused to detect the failure includes the apparatus caused to:
receive one or more measurements of the environmental condition in the first confined area; and
compare the one or more measurements to the setpoint.

4. The apparatus of claim 1, wherein the apparatus caused to control the at least one of the first HVAC unit and/or the second HVAC unit comprises:
the apparatus caused to control the first HVAC unit to reduce air pressure in the first confined area, and thereby draw additional conditioned air to the first confined area from the second confined area.

5. The apparatus of claim 1, wherein the apparatus caused to control the at least one of the first HVAC unit or the second HVAC unit comprises:
the apparatus caused to control the second HVAC unit to produce additional conditioned air in the second confined area, the additional conditioned air caused to permeate to the first confined area.

6. The apparatus of claim 1, wherein the processing circuitry is configured to execute the computer-readable program code to cause the apparatus to further at least:
perform an evaluation of states of barriers that directly or indirectly allow ingress into and egress out of the first confined area to determine the second HVAC unit configured to control the environmental condition in the second confined area having one or more open pathways for additional conditioned air to permeate to the first confined area from the second confined area relative to one or more other confined areas of the plurality of confined areas, wherein
the at least one of the first HVAC unit and/or the second HVAC unit is controlled based on the evaluation of the states of the barriers,
the barriers comprise the barrier, and
the evaluation of the states of the barriers comprises the evaluation of the state of the barrier.

7. The apparatus of claim 1, wherein the processing circuitry is configured to execute the computer-readable program code to cause the apparatus to further at least:
monitor the first confined area as the at least one of the first HVAC unit and/or the second HVAC unit is controlled to compensate for the failure;
determine failure of the environmental condition in the first confined area to move at least a threshold amount closer to the setpoint within a specified time period; and
perform a further action in response to the failure of the environmental condition to move at least the threshold amount closer to the setpoint.

8. The apparatus of claim 7, wherein the apparatus caused to perform the further action includes the apparatus caused to cease control of the at least one of the first HVAC unit and/or the second HVAC unit to compensate for the failure.

9. The apparatus of claim 7, wherein the apparatus caused to perform the further action includes the apparatus caused to notify a facility operator of at least one of the failure of the first HVAC unit, or the failure of the environmental condition to move at least the threshold amount closer to the setpoint.

10. The apparatus of claim 7, wherein the apparatus caused to perform the further action includes the apparatus caused to control access control equipment in the facility to control one or more barriers that directly or indirectly allow ingress into and egress out of the first confined area or the second confined area to facilitate permeation of the additional conditioned air to the first confined area.

11. A method of controlling heating, ventilation and air conditioning (HVAC) equipment, the method comprising:
monitoring at least one or more of a plurality of HVAC units of the HVAC equipment and/or one or more confined areas of a plurality of confined areas of a facility, wherein
the method controls environmental conditions in the plurality of confined areas by controlling the plurality of HVAC units;
detecting a failure of a first HVAC unit of the plurality of HVAC units to control an environmental condition within a first confined area of the plurality of confined areas to a setpoint for the environmental condition, wherein
the environmental condition comprises at least one of a temperature within the first confined area, a humidity within the first confined area, or an air quality within the first confined area; and
in response to detection of the failure, automatically controlling at least one of the first HVAC unit and/or a second HVAC unit of the plurality of HVAC units to cause additional conditioned air to permeate into the first confined area from a second confined area of the plurality of confined areas, at least in part, via a pathway between the first confined area and the second confined area, wherein the flow of the additional conditioned air via the pathway is affected by a barrier, the automatic control of the at least one of the first HVAC unit and/or the second HVAC unit is based, at least in part on an evaluation of a state of the barrier, the second confined area is adjacent to the first confined area, and the additional conditioned air compensates for the failure, at least in part, by moving the environmental condition in the first confined area closer to the setpoint, and automatically controlling a third HVAC unit of the plurality of HVAC units to maintain another environmental condition in a third confined area of the plurality of confined areas at another setpoint, wherein the third confined area is not adjacent to the first confined area, and the another environmental condition comprises at least one of a temperature within the third confined area, a humidity within the third confined area, or an air quality within the third confined area.

12. The method of claim 11, wherein detecting the failure includes receiving a report of the failure from the first HVAC unit.

13. The method of claim 11, wherein detecting the failure comprises:

receiving one or more measurements of the environmental condition in the first confined area; and comparing the one or more measurements to the setpoint.

14. The method of claim 11, wherein controlling the at least one of the first HVAC unit and/or the second HVAC unit comprises:

controlling the first HVAC unit to reduce air pressure in the first confined area, and thereby draw additional conditioned air to the first confined area from the second confined area.

15. The method of claim 11, wherein controlling the at least one of the first HVAC unit and/or the second HVAC unit comprises:

controlling the second HVAC unit to produce additional conditioned air in the second confined area, the additional conditioned air caused to permeate to the first confined area.

16. The method of claim 11, further comprising:

performing an evaluation of states of barriers that directly or indirectly allow ingress into and egress out of the first confined area to determine the second HVAC unit configured to control the environmental condition in the second confined area having more open pathways for additional conditioned air to permeate to the first confined area from the second confined area relative to one or more other confined areas of the plurality of confined areas, wherein the at least one of the first HVAC unit and/or the second HVAC unit is controlled based on the evaluation of the states of the barriers, the barriers comprise the barrier, and the evaluation of the states of the barriers comprises the evaluation of the state of the barrier.

17. The method of claim 11, further comprising:

monitoring the first confined area as the at least one of the first HVAC unit and/or the second HVAC unit is controlled to compensate for the failure;

determining failure of the environmental condition in the first confined area to move at least a threshold amount closer to the setpoint within a specified time period; and performing a further action in response to the failure of the environmental condition to move at least the threshold amount closer to the setpoint.

18. The method of claim 17, wherein performing the further action includes ceasing control of the at least one of the first HVAC unit and/or the second HVAC unit to compensate for the failure.

19. The method of claim 17, wherein performing the further action includes notifying a facility operator of at least one of the failure of the first HVAC unit, or the failure of the environmental condition to move at least the threshold amount closer to the setpoint.

20. The method of claim 17, wherein performing the further action includes controlling access control equipment in the facility to control one or more barriers that directly or indirectly allow ingress into and egress out of the first confined area or the second confined area to facilitate permeation of the additional conditioned air to the first confined area.

* * * * *